United States Patent
Mizuno et al.

(10) Patent No.: US 7,849,280 B2
(45) Date of Patent: Dec. 7, 2010

(54) STORAGE SYSTEM AND POWER CONSUMPTION REDUCTION METHOD, AND INFORMATION PROCESSING APPARATUS

(75) Inventors: Jun Mizuno, Yokohama (JP); Hiroshi Nasu, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 11/968,336

(22) Filed: Jan. 2, 2008

(65) Prior Publication Data

US 2009/0013137 A1  Jan. 8, 2009

(30) Foreign Application Priority Data

Jul. 6, 2007  (JP) .............................. 2007-178830

(51) Int. Cl.
*G06F 3/06* (2006.01)
(52) U.S. Cl. ...................... 711/162; 713/324
(58) Field of Classification Search ................ 711/162; 713/324

See application file for complete search history.

(56) References Cited

U.S. PATENT DOCUMENTS

| | | | |
|---|---|---|---|
| 5,900,007 A * | 5/1999 | Nunnelley et al. ............. 711/4 |
| 2005/0055601 A1 * | 3/2005 | Wilson et al. .................. 714/5 |
| 2006/0193073 A1 | 8/2006 | Hakamata et al. |
| 2007/0094316 A1 | 4/2007 | Rodriguez et al. |
| 2007/0143542 A1 * | 6/2007 | Watanabe et al. ........... 711/114 |
| 2007/0245165 A1 * | 10/2007 | Fung ........................... 713/320 |
| 2008/0005461 A1 * | 1/2008 | Toda et al. .................. 711/112 |
| 2008/0104431 A1 * | 5/2008 | Shimada ..................... 713/300 |
| 2008/0168223 A1 * | 7/2008 | Reeves et al. ............... 711/114 |

FOREIGN PATENT DOCUMENTS

| | | |
|---|---|---|
| JP | 2000/293314 | 10/2000 |
| WO | 2005/043323 A2 | 5/2005 |

* cited by examiner

*Primary Examiner*—Jared I Rutz
(74) *Attorney, Agent, or Firm*—Brundidge & Stanger, P.C.

(57) ABSTRACT

In a storage system including: plural information processing apparatuses each of which copies data sent from a host computer to create archive data in accordance with redundancy sent from the host computer; and a storage apparatus having physical disks that store the archive data, the storage apparatus includes a management unit that manages power state information that is information on whether or not the power state of each of the physical disks is "on," and the information processing apparatuses each include an acquisition unit that acquires the power state information managed by the management unit and a determination unit that determines an information processing apparatus targeted for reading or writing the archive data from among the information processing apparatuses based on the power state information acquired by the acquisition unit.

17 Claims, 15 Drawing Sheets

FIG.5

LOGICAL VOLUME TABLE (27)

| LOGICAL VOLUME ID | PHYSICAL DISK ID |
|---|---|
| VOL1 | PG1 |
| VOL2 | PG2 |
| VOL3 | PG3 |
| VOL4 | PG4 |

PHYSICAL DISK POWER STATE TABLE (28)

| PHYSICAL DISK ID | POWER STATE | POWER STATE CHANGE TIME |
|---|---|---|
| PG1 | OFF | 2007/04/01 00:00 |
| PG2 | OFF | 2007/03/31 09:00 |
| PG3 | ON | 2007/04/15 10:00 |
| PG4 | OFF | 2007/04/01 00:00 |

POWER-SAVING WAITING-TIME TABLE (29)

| POWER-SAVING WAITING-TIME |
|---|
| 30 min |

VOLUME TABLE 39

| ARCHIVE NODE ID | STORAGE ID | LOGICAL VOLUME ID | USED CAPACITY | POWER STATE | POWER STATE CHANGE TIME |
|---|---|---|---|---|---|
| NODE 1 | STORAGE A | VOL1 | 10GB | OFF | 2007/04/01 00:00 |
| NODE 2 | STORAGE A | VOL2 | 20GB | OFF | 2007/03/31 09:00 |
| NODE 3 | STORAGE A | VOL3 | 10GB | ON | 2007/04/15 10:00 |
| NODE 4 | STORAGE A | VOL4 | 5GB | OFF | 2007/04/01 00:00 |
| 39A | 39B | 39C | 39D | 39E | 39F |

FIG.9

40
MAPPING TABLE

| ARCHIVE DATA ID | REDUNDANCY | DATA STORAGE NODE |
|---|---|---|
| /data/file_a | 3 | NODE 1, NODE 2, NODE 3 |
| /data/file_b | 3 | NODE 4, NODE 1, NODE 2 |
| /data/file_c | 3 | NODE 3, NODE 4, NODE 1 |
| /data/file_d | 3 | NODE 2, NODE 3, NODE 4 |

40A     40B     40C

STORAGE SYSTEM AND POWER CONSUMPTION REDUCTION METHOD, AND INFORMATION PROCESSING APPARATUS

CROSS-REFERENCE TO RELATED APPLICATIONS

This application relates to and claims priority from Japanese Patent Application No. 2007-178830, filed on Jul. 6, 2007, the entire disclosure of which is incorporated herein by reference.

BACKGROUND

The invention relates to a storage system and a power consumption reduction method, and an information processing apparatus, and is suitable for use in, for example, an archive system for storing data sent from a host computer.

In general, an archive system is composed of host computers for separately conducting their operations and an archive apparatus for conducting read/write of data according to commands from each of the host computers. The archive apparatus is composed of a computer called an archive node (information processing apparatus) and a storage apparatus for conducting read/write of data according to a command from the archive node. The archive apparatus provides the host computer with storage areas. The archive node commands the storage apparatus to conduct read/write of data upon receiving a command to conduct read/write of data from the host computer. The storage apparatus divides a physical disk into plural storage areas for management, and provides the storage areas as logical volumes to the archive node. Each logical volume is composed of plural segments. Each storage area on a physical disk is assigned to each segment, which enables read/write of data according to the command from the host computer.

For example, disclosed in WO 2005/043323, Pamphlet is a dispersion archive technique in which: a cluster is composed of plural archive nodes in an archive apparatus; archive data is written to the archive nodes in accordance with redundancy specified by a host computer; and in this way, the host computer can access the archive data even when errors occur in parts of the archive nodes.

Also, JP2000-293314 A discloses a power-saving technique in which, when there is no access to all the logical volumes constituted by specific hard disks for a fixed period in a storage apparatus, the power supply of each of the hard disks constituting the logical volumes is interrupted or put into a power saving mode.

However, the following problem arises when the dispersion archive technique in prior art is combined with a power saving technique, thereby reducing power consumption of a storage system in an archive system, which utilizes the dispersion archive technique by using the power saving technique.

In the dispersion archive technique, the archive data written to the archive system is distributed to the archive nodes constituting the cluster.

Therefore, the archive nodes access the logical volume in the storage apparatus with roughly the same frequency so the period during which there is no access to the logical volume is shortened.

Accordingly, a problem arises in that the move to the interruption or the power saving mode for the power supply of each of the hard disks constituting the logical volumes cannot be realized, which means that the reduction of power consumption in the storage apparatus cannot be achieved.

SUMMARY

The present invention has been made in light of the above, and an object of the invention is to provide a storage system and a power-consumption reduction method, and an information processing apparatus, which enables reduction in power consumption of a storage apparatus.

In order to solve the above-described object, according to an aspect of the present invention, provided is a storage system including: plural information processing apparatuses each of which copies data sent from a host computer to create archive data in accordance with redundancy sent from the host computer; and a storage apparatus having physical disks that store the archive data, in which: the storage apparatus includes a management unit that manages power state information that is information on whether or not a power state of each of the physical disks is "on"; and the information processing apparatuses each include an acquisition unit that acquires the power state information managed by the management unit and a determination unit that determines an information processing apparatus targeted for reading or writing the archive data from among the information processing apparatuses based on the power state information acquired by the acquisition unit.

Also, according to another aspect of the invention, provided is a power consumption reduction method for a storage system having: plural information processing apparatuses each of which copies data sent from a host computer to create archive data in accordance with redundancy sent from the host computer; and a storage apparatus having physical disks that store the archive data, the method including: a first step of acquiring power state information that is information on whether or not a power state of each of the physical disks is "on"; and a second step of determining an information processing apparatus targeted for reading or writing the archive data from among the information processing apparatuses based on the power state information acquired by the first step.

Moreover, according to another aspect of the invention, provided is an information processing apparatus that copies data sent from a host computer to create archive data in accordance with redundancy sent from the host computer, the information processing apparatus including: an acquisition unit that acquires power state information that is information on whether or not a power state of each of physical disks in a storage apparatus that stores the archive data is "on"; and a determination unit that determines an information processing apparatus targeted for reading or writing the archive data from among information processing apparatuses based on the power state information acquired by the acquisition unit.

Accordingly, the access to the physical disk whose power is "off" can be reduced when reading archive data. Therefore, the period during which there is no access to the physical disk can be lengthened. As a result, the period during which the power of the physical disk is "off" can be lengthened.

According to the invention, a storage system and a power consumption reduction method, and an information processing apparatus, which enables reduction in power consumption of a storage apparatus, can be realized.

BRIEF DESCRIPTION OF THE DRAWINGS

FIG. 5 is a diagram showing a logical volume table.

FIG. 6 is a diagram showing a configuration for a physical disk power state table.

FIG. 7 is a diagram showing a configuration for a power-saving waiting-time table.

FIG. 8 is a diagram showing a configuration for a volume table.

FIG. 9 is a diagram showing a configuration for a mapping table.

DETAILED DESCRIPTION OF PREFERRED EMBODIMENTS

An embodiment of the present invention will be described in detail.

(1) Configuration for Archive System in accordance with First Embodiment

Figure 1:
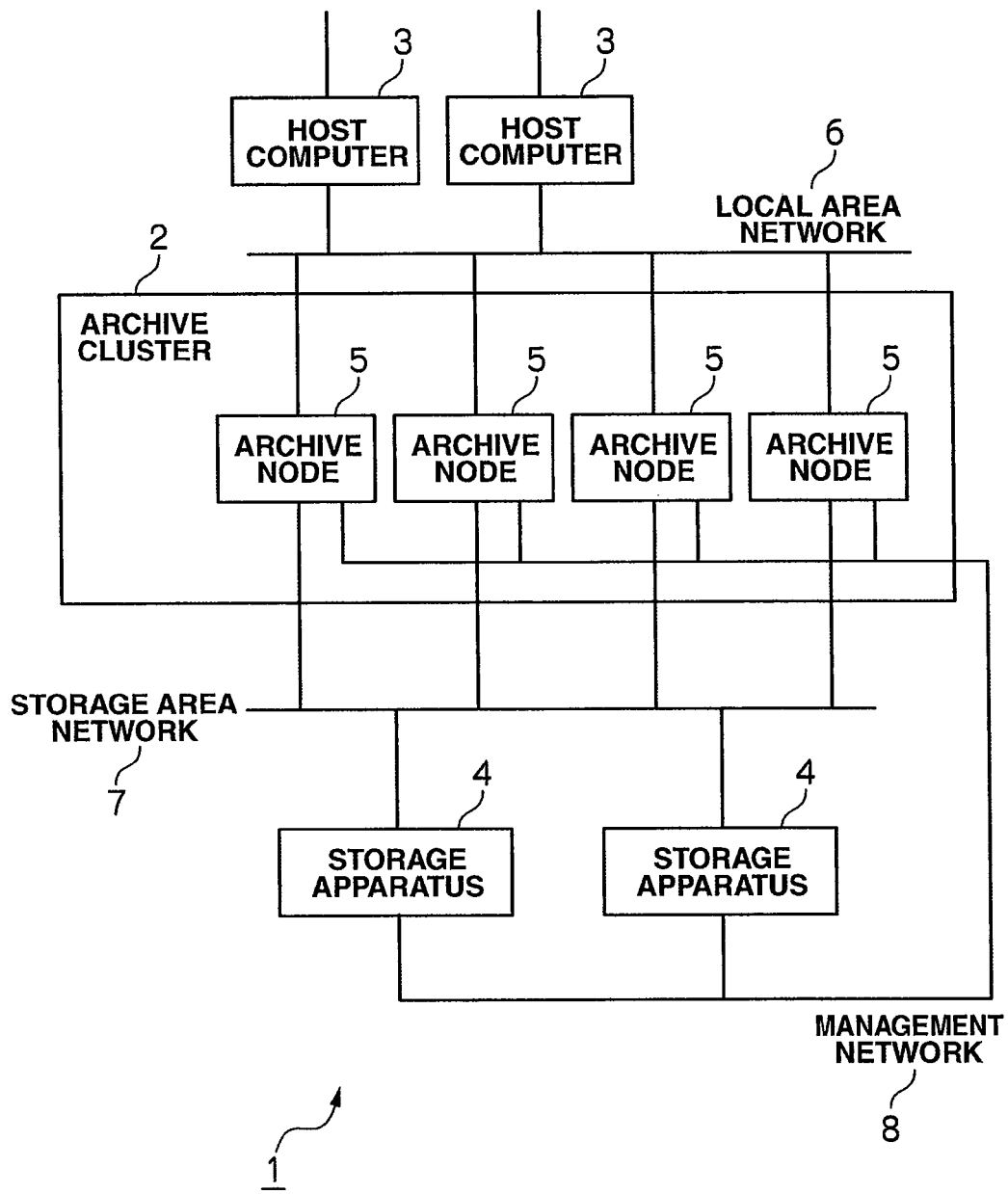
FIG. 1 is a diagram showing a configuration for an archive system.

FIG. 1 is a schematic diagram of an archive system (storage apparatus) in which a first embodiment of the invention is utilized. As shown in the figure, the archive system 1 in this embodiment is composed of an archive cluster 2, one or more host computers 3, and one or more storage apparatuses 4.

The archive cluster 2 is composed of one or more archive nodes (information processing apparatuses) 5. In this embodiment, the host computers 3 are connected to the archive nodes 5 via a local area network 6. The archive nodes 5 are connected to the storage apparatuses 4 via a storage area network 7. Also, the archive nodes 5 are connected to the storage apparatuses 4 via a management network 8. However, a single network may collectively serve as the local area network 6, the storage area network 7, and the management network 8.

Figure 2:
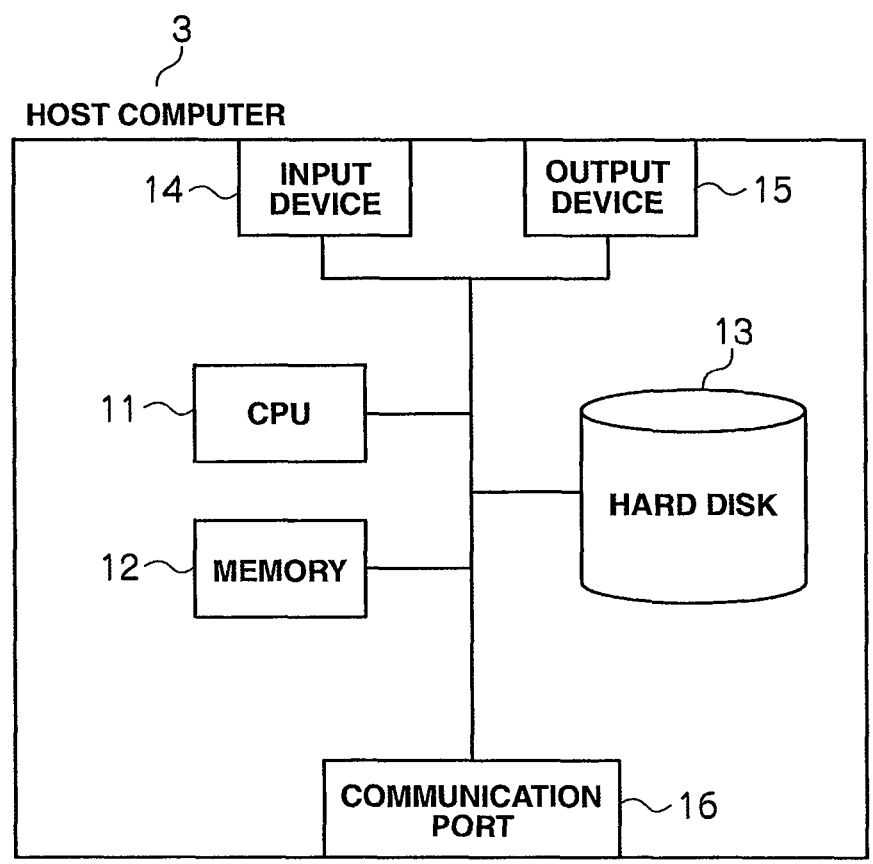
FIG. 2 is a diagram showing a configuration for a host computer.

FIG. 2 is a diagram showing a configuration for the host computer 3. The host computer 3 is composed of a CPU (Central Processing Unit) 11, memory 12, a hard disk 13, an input device 14, an output device 15, and a communication port 16 for communicating with each of the archive nodes 5.

The host computer 3 specifies redundancy to each archive node 5 and commands it to store archive data. The archive node 5 conducts replication of the archive data to produce the number of sets of data corresponding to the specified redundancy, and sends them to the archive nodes 5 separately. Each archive node 5 stores the sent archive data in the storage apparatus 4.

The host computer 3 commands the archive node 5 to read archive data. Upon receiving a request to read archive data, the archive node 5 sends the requested archive data from among the archive data stored in the archive cluster 2 to the host computer 3.

Figure 3:
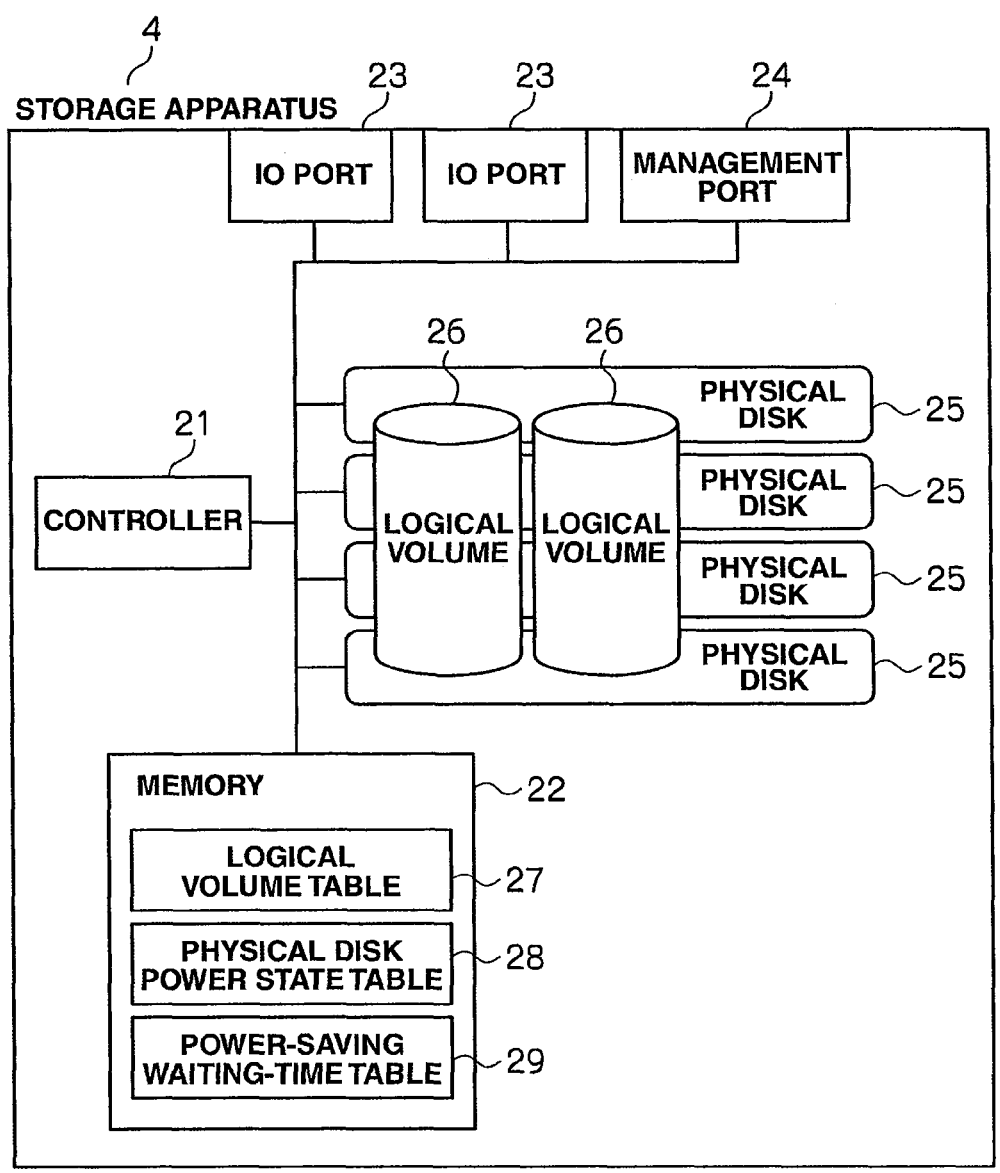
FIG. 3 is a diagram showing a configuration for a storage apparatus.

FIG. 3 is a diagram showing a configuration for the storage apparatus 4.

The storage apparatus 4 is composed of a controller 21 for controlling the storage apparatus 4, memory 22, I/O ports 23 and a management port 24 that are used for communication with each of the archive nodes 5, and one or more physical disks 25.

The storage apparatus 4 has logical volumes 26 composed of the physical disks 25, receives I/O requests to the logical volume 26 from the archive node 5, and stores archive data. Note that the storage apparatus 4 may store archive data in the physical disks 25 without having the logical volumes 26.

The memory 22 includes a logical volume table 27 for managing the relationship between the physical disks 25 and the logical volumes 26, a physical disk power state table 28 for managing the power state of each physical disk 25, and a power-saving waiting-time table 29 for managing the period for movement to power-off (OFF), power saving mode, etc.

FIG. 5 is a diagram showing a configuration for the logical volume table 27. The logical volume table 27 includes a column for a logical volume ID 27A for identifying the logical volume 26 and a column for a physical disk ID 27B for identifying the physical disk 25 that constitutes the logical volume 26.

FIG. 6 is a diagram showing a configuration for the physical disk power state table 28. The physical disk power state table 28 includes a column for a physical disk ID 28A for identifying the physical disk 25, a column for a power state 28B for indicating the power state of the physical disk 25; and a column for a power state change time 28C for indicating the time of the change in the power state. The column for the power state 28B stores any of "ON" indicating a power-on (ON) state, "OFF" indicating a power-off state, and "POWER SAVING" indicating a power saving state.

FIG. 7 is a diagram showing a configuration for the power-saving waiting-time table 29. The power-saving waiting-time table 29 consists of a column for power-saving waiting-time 29A for specifying a period during which there is no access to the physical disk 25 and which serves as a trigger to move to the power-off or power saving mode.

The storage apparatus 4 monitors access to the physical disks 25, turns off the power of the relevant physical disk 25 when the period during which there is no access to the physical disk 25 exceeds the period stored in the column for the power-saving waiting-time 29A in the power-saving waiting-time table 29, and stores "OFF" in the column for the power state 28B regarding the record for the relevant physical disk 25 among the records stored in the physical disk power state table 28.

In this embodiment, when the period during which there is no access to the physical disk 25 exceeds the power-saving waiting-time 29A, the power to the physical disk 25 is turned off. However, the physical disk 25 may be moved to the power saving mode, and "POWER SAVING" may be stored in the column for the power state 28B regarding the record for the relevant physical disk 25 among the records stored in the physical disk power state table 28.

Also, upon receiving a request for power-on specifying a logical volume ID, the storage apparatus 4 refers to the logical volume table 27 to retrieve the relevant physical disk 25 for the logical volume ID specified by the request, and turns on the power of the retrieved physical disk 25.

Moreover, upon receiving a request for logical volume information from the archive node 5, the storage apparatus 4 sends the information stored in the logical volume table 27 to the request source. Upon receiving a request for information on the power state of the physical disk 25 from the archive node 5, the storage apparatus 4 sends the information stored in the physical disk power state table 28 to the request source.

Furthermore, when the power state of the physical disk 25 is changed, the storage apparatus 4 sends power state change notification for notification of the change of the power state to the previously registered host computer 3.

Figure 4:
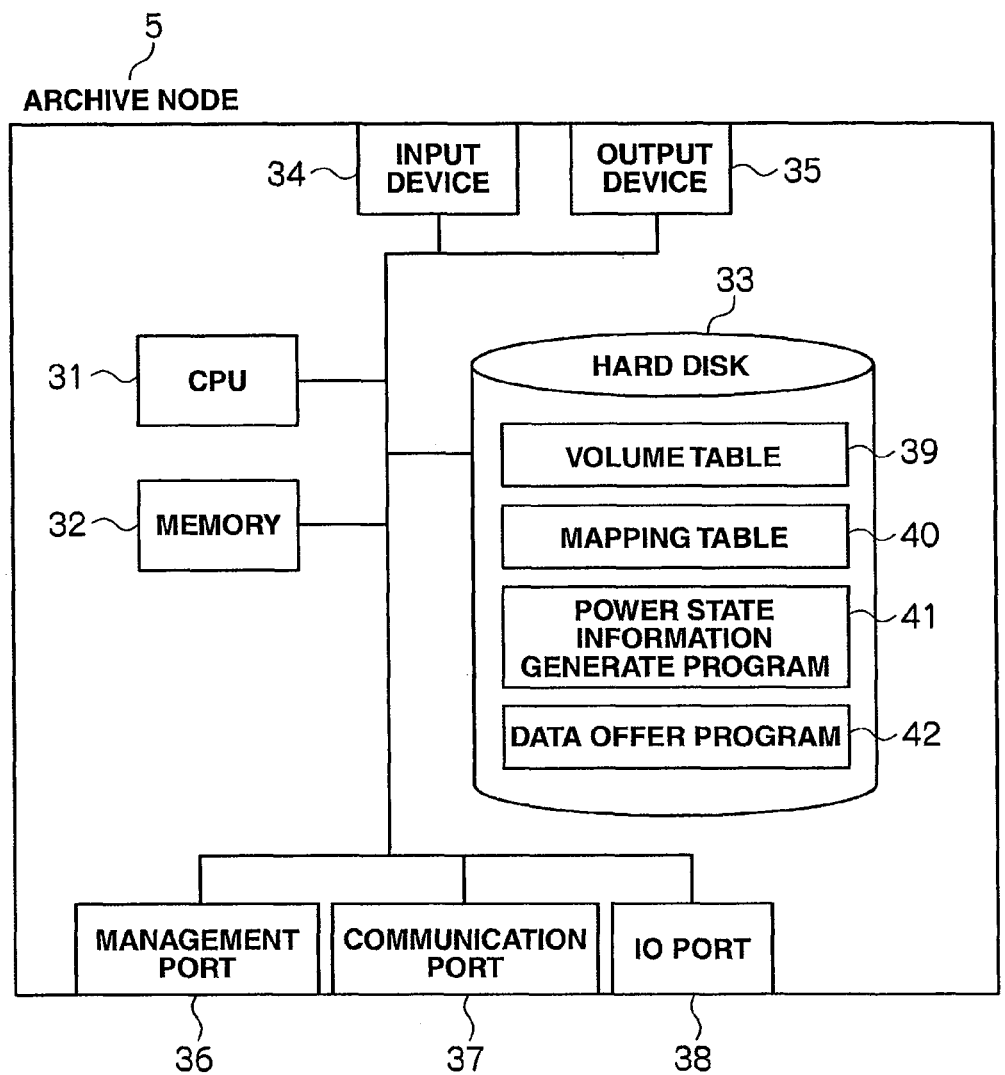
FIG. 4 is a diagram showing a configuration for an archive node.

FIG. 4 is a diagram showing a configuration for the archive node 5. The archive node 5 is composed of a CPU 31, memory 32, a hard disk 33, an input device 34, an output device 35, a management port 36, a communication port 37 for communicating archive data with the host computer 3, and an I/O port 38 for communicating archive data with the storage apparatus 4.

The hard disk 33 includes a volume table 39 for managing the used capacity and power state for each logical volume 26 used by the archive node 5 on an archive-node basis and a mapping table 40 for managing the archive nodes 5 which serve as data storage destinations on an archive-node basis.

FIG. 8 is a diagram showing a configuration for the volume table 39.

The volume table 39 is composed of a column for an archive node ID 39A for identifying the archive node 5; a column for a storage ID 39B for identifying the storage apparatus 4 used by the archive node 5; a column for a logical volume ID 39C for identifying the logical volume 26, a column for a used capacity 39D for indicating the used capacity for the archive node 5, a column for a power state 39E for indicating the power state of the physical disk 25 constituting the logical volume 26, and a column for a power state change time 39F for indicating the time of the change in the power state. The column for the power state 39D stores any of "ON" indicating a power-on state, "OFF" indicating a power-off state, and "POWER SAVING" indicating a power saving state.

Note that, of the information managed in the volume table 39, the information stored in the column fro the archive node ID 39A, the column for the storage ID 39B, and the column for the logical volume ID 39C is previously set by an administrator using a configuration file or a setting interface such as a GUI (Graphical User Interface) or a CLI (Command Line Interface).

FIG. 9 is a diagram showing a configuration for the mapping table 40. The mapping table 40 includes a column for an archive data ID 40A for identifying archive data, a column for redundancy. 40B for indicating the redundancy for the archive data specified by the host computer 3, and a column for a data storage node 40C for indicating the information on the archive node 5 that stores archive data. When there are plural archive nodes 5 that store the same archive data, the column for the data storage node 40C stores the archive node IDs of the archive nodes 5, for example, separated by commas.

Provided in the hard disk 33 are a power state information generate program 41 that acquires information stored in the logical volume table 27 and the physical disk power state table 28 in the storage apparatus 4 and a data offer program 42 that determines the archive node 5 that reads the archive data requested to be read.

The operation of the archive node 5 in this embodiment will be described below.

Figure 10:
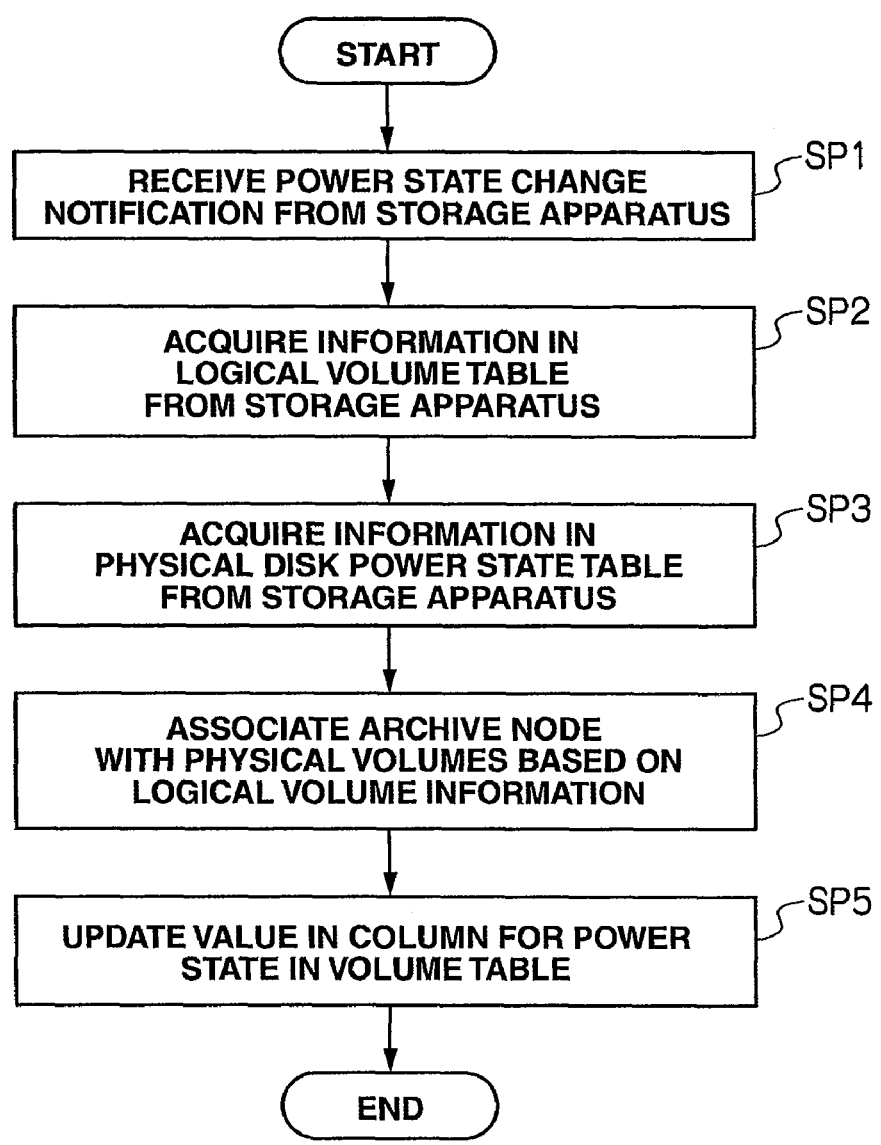
FIG. 10 is a flowchart illustrating a procedure for the processing in accordance with a power state information generate program in an archive node.

FIG. 10 is a flowchart illustrating a procedure for the processing in accordance with the power state information generate program 41 in the archive node 5.

Explanation will be given below by referring to the programs as the agents of various kinds of processing for clarifying the content of the processing executed by the CPU 31 of the archive node 5 based on each program; however, it is obvious that the corresponding CPU 31 actually executes the processing based on the program.

First, the power state information generate program 41 receives power state change notification from the storage apparatus 4 (SP1). Incidentally, in this case, the power state information generate program 41 in each archive node 5 receives the power state change notification from the storage apparatus 4.

Next, the power state information generate program 41 sends a request for logical volume information to the storage apparatus 4 that has sent the power state change notification, and acquires the information stored in the logical volume table 27 in the storage apparatus 4 as a response to the request (SP2).

Then, the power state information generate program 41 sends a request for physical disk power state information to the storage apparatus 4 that has sent the power state change notification, and acquires the information stored in the physical disk power state table 28 in the storage apparatus 4 as a response to the request (SP3).

The power state information generate program 41 then associates the archive node 5 with the physical disks 25 by using the logical volume information acquired from the storage apparatus 4 specified in the column for the storage ID 39B regarding all the records in the volume table 39 in the archive node 5 (SP4).

The power state information generate program 41 retrieves the physical disk power state information acquired from the storage apparatus 4 specified in the column for the storage ID 39B with the physical disk ID of each of the associated physical disks 25 as a key, and enters, in the column for the power state 39E, the value for the power state in the record that has a physical disk ID that conforms to the above physical disk ID (SP5).

The above was a description of processing for the power state information generate program 41 in the archive node 5.

In this embodiment, receiving the power state change notification from the storage apparatus 4 serves as a trigger to start the processing in accordance with the power state information generate program. However, a configuration may be adopted in which processing in accordance with the power state information generate program 41 is executed regularly with respect to the previously registered storage apparatus 4.

Also, the archive node 5 receiving an I/O request from the host computer 3 may be a trigger to start the power state information generate program 41.

Figure 11:
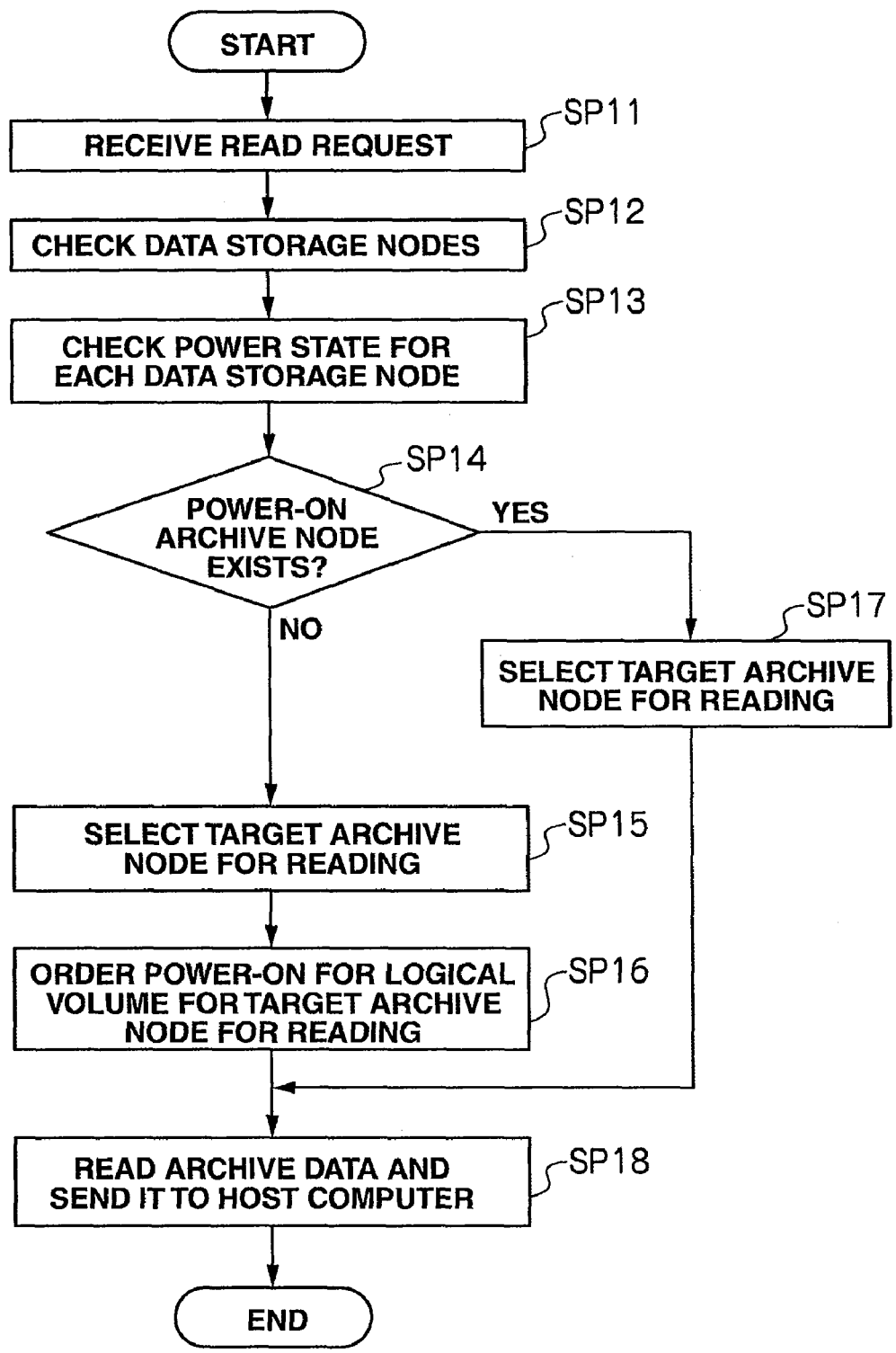
FIG. 11 is a flowchart illustrating a procedure for the processing in accordance with a data offer program in an archive node (first embodiment).

FIG. 11 is a flowchart illustrating the processing in accordance with the data offer program 42 in the archive node 5.

First, the data offer program 42 receives an archive data ID as a request to read archive data from the host computer 3 (SP11). Incidentally, in this case, the data offer program 42 of a predetermined archive node 5 receives an archive data ID as a request to read archive data from the host computer 3.

Next, the data offer program 42 retrieves the record including the value for the archive data ID 40A equivalent to the archive data ID in the read request from among the records stored in the mapping table 40, and acquires all the archive node IDs specified in the column for the data storage node 40C in the retrieved record (SP12).

Then, the data offer program 42 retrieves the record including the value for the column for the archive node ID 39A equivalent to the acquired archive node ID and "ON" in the column for the power state 39E, and checks the number of relevant records, from among the records stored in the volume table 39 (SP13).

After the checking of the number of relevant records (SP13), the data offer program 42 checks whether there are power-on archive nodes 5 (SP14).

Then, when the checked number of power-on records is "0," i.e., there is no power-on archive node 5 (SP14: NO), the data offer program 42 selects one of the archive nodes 5 storing archive data as a target for reading archive data (SP15).

When there are plural candidate archive nodes 5 for the reading target, the data offer program 42, for example, refers to the value in the column for the power state change time 39F, and selects the archive node 5 with the earliest power state change time. The data offer program 42 also may select the archive node 5 with, e.g., the least used capacity or the archive node 5 with, e.g., the most unused capacity.

Next, the data offer program 42 retrieves the record for the selected archive node 5 from the volume table 39, acquires the relevant storage ID value and logical volume ID value, and specifies the acquired logical volume ID to the storage apparatus 4 with the acquired storage apparatus ID to send a request to turn on the relevant physical disk to the storage apparatus 4 (SP16).

Meanwhile, when the obtained number of power-on records is not "0," i.e., there exists a power-on archive node 5 (SP14: YES), the data offer program 42 selects one archive node 5 as a target for reading archive data from among the archive nodes 5 in the retrieved power-on records (SP17).

When there are plural candidate archive nodes 5 for the reading target, the data offer program 42, for example, refers to the value in the column for the power state change time 39F, and selects the archive node 5 with the earliest power state change time. The data offer program 42 also may select the archive node 5 with, e.g., the least used capacity or the archive node 5 with, e.g., the most unused capacity.

Next, the data offer program 42 commands the archive node 5 selected as the target for reading archive data to read the archive data, whereby the obtained archive data is sent to the host computer 3 that has issued the read request (SP18).

The above was a description of processing in accordance with the data offer program 42 in the archive node 5.

Also, regarding the operation conducted when the archive node 5 receives a request to write archive data, methods disclosed in prior art or other methods may be employed when writing archive data.

The operation in the archive node 5 in this embodiment has been described above.

In this embodiment, the power state information generate program 41 operates in the archive node 5. However, a configuration may be adopted in which the power state information generate program 41 operates in another apparatus such as an administrative server, thereby creating or updating the volume table 39 in the archive node 5.

According to this embodiment, in the archive system 1, the access to the logical volume 26 composed of the physical disk 25 whose power is in an off or power saving mode can be reduced when reading archive data. Therefore, the period during which there is no access to the physical disk 25 can be lengthened. As a result, in the archive system 1, the period during which the power of the physical disk 25 is in an off or power saving mode can be lengthened, and accordingly, the advantageous effect of reduction of the power consumption of the storage apparatus 4 can be obtained.

(2) Configuration for Archive System in accordance with Second Embodiment

Figure 12:
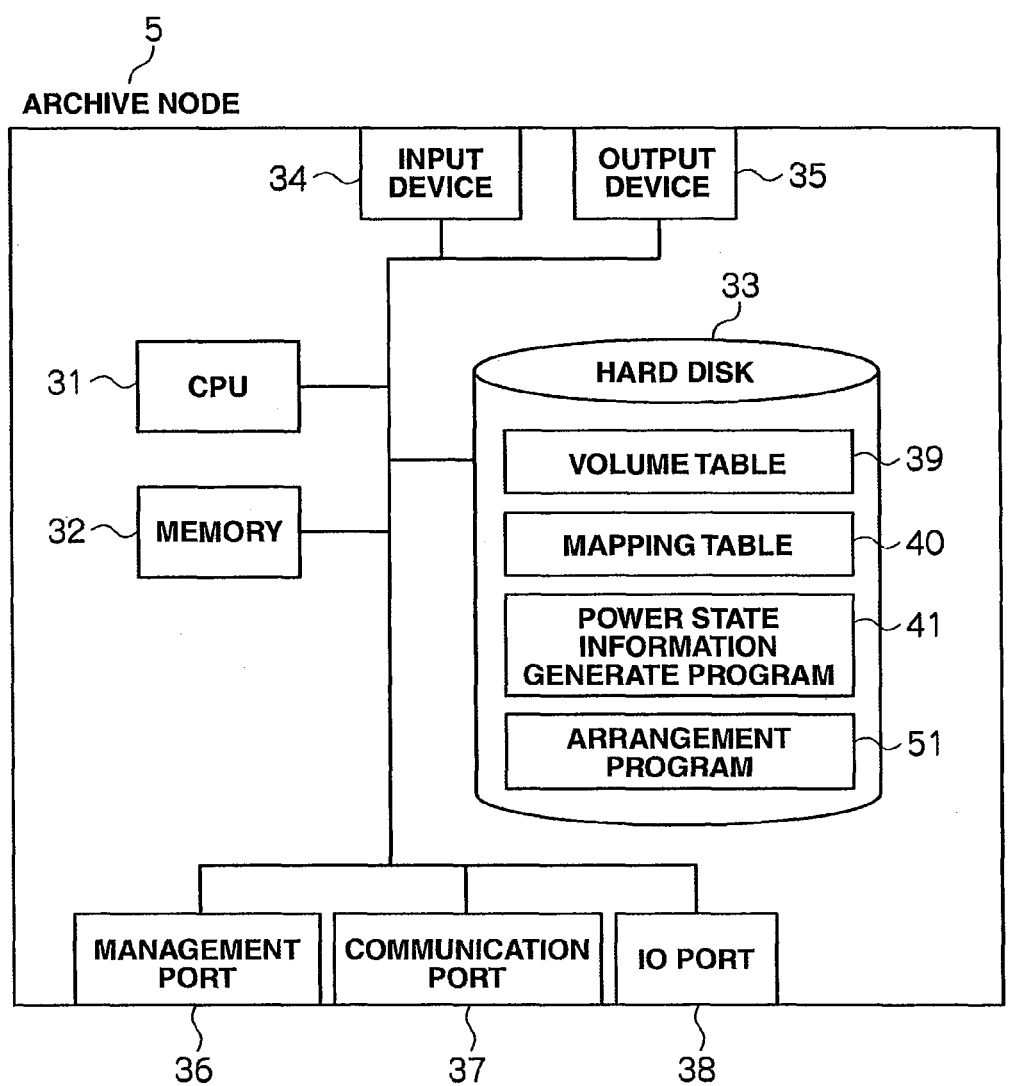
FIG. 12 is a diagram showing a configuration for an archive node (second embodiment).

A second embodiment of the present invention will be described below with reference to the accompanying figures. The configuration for the archive system 1 in the second embodiment is substantially the same as that for the archive system 1 in the first embodiment, as shown in FIG. 12, but differs on the point that: the data offer program 42 is deleted from the hard disk 33 in the archive node 5; and the hard disk 33 is also provided with an arrangement program 51 for determining the archive node 5 that stores the archive data requested to be written by the host computer 3.

The processing in accordance with the arrangement program 51 provided in the hard disk 33 in the archive node 5 in this embodiment will be described below.

Figure 13:
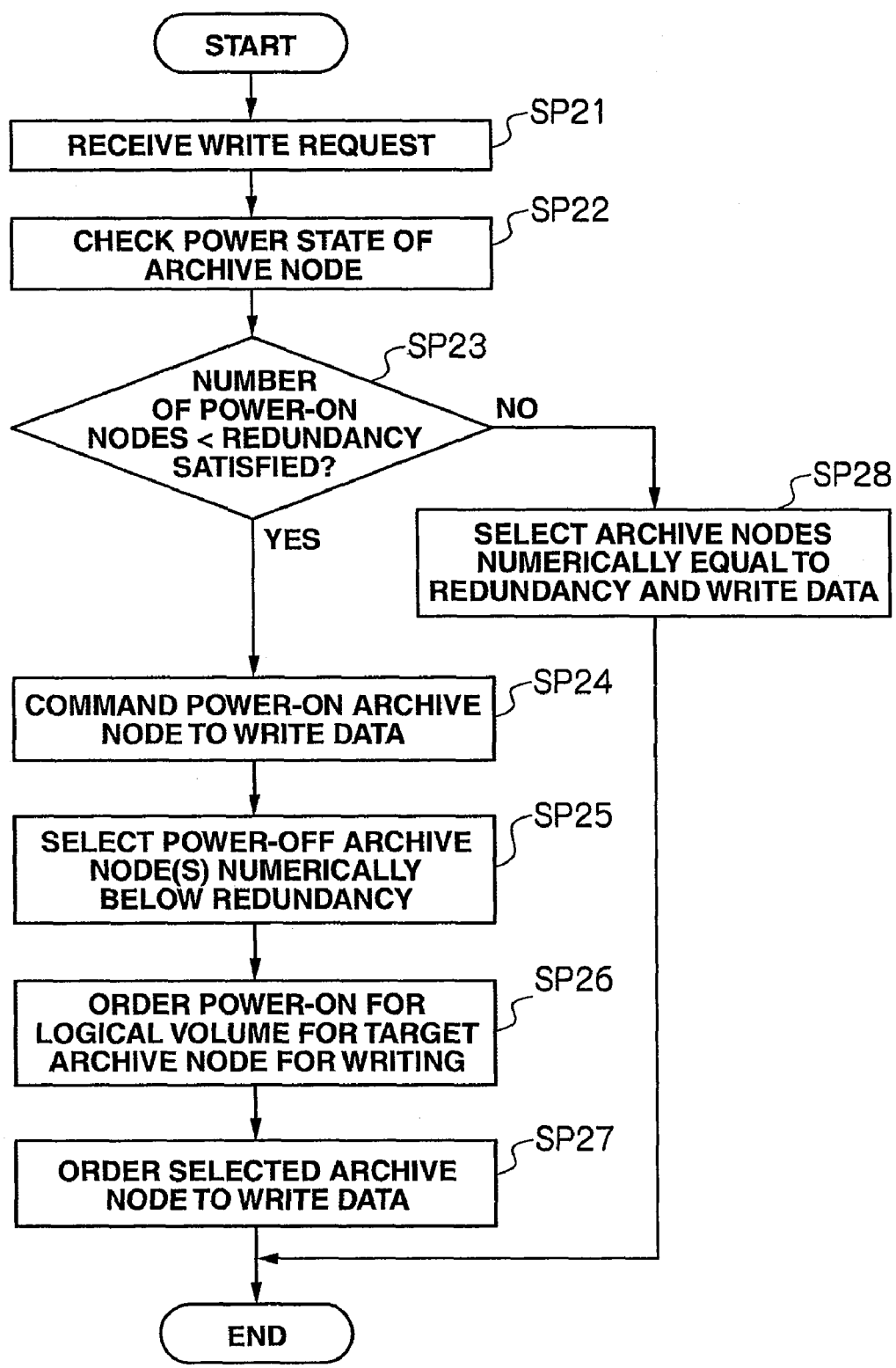
FIG. 13 is a flowchart illustrating a procedure for the processing in accordance with an arrangement program in an archive node (second embodiment).
Figure 14:
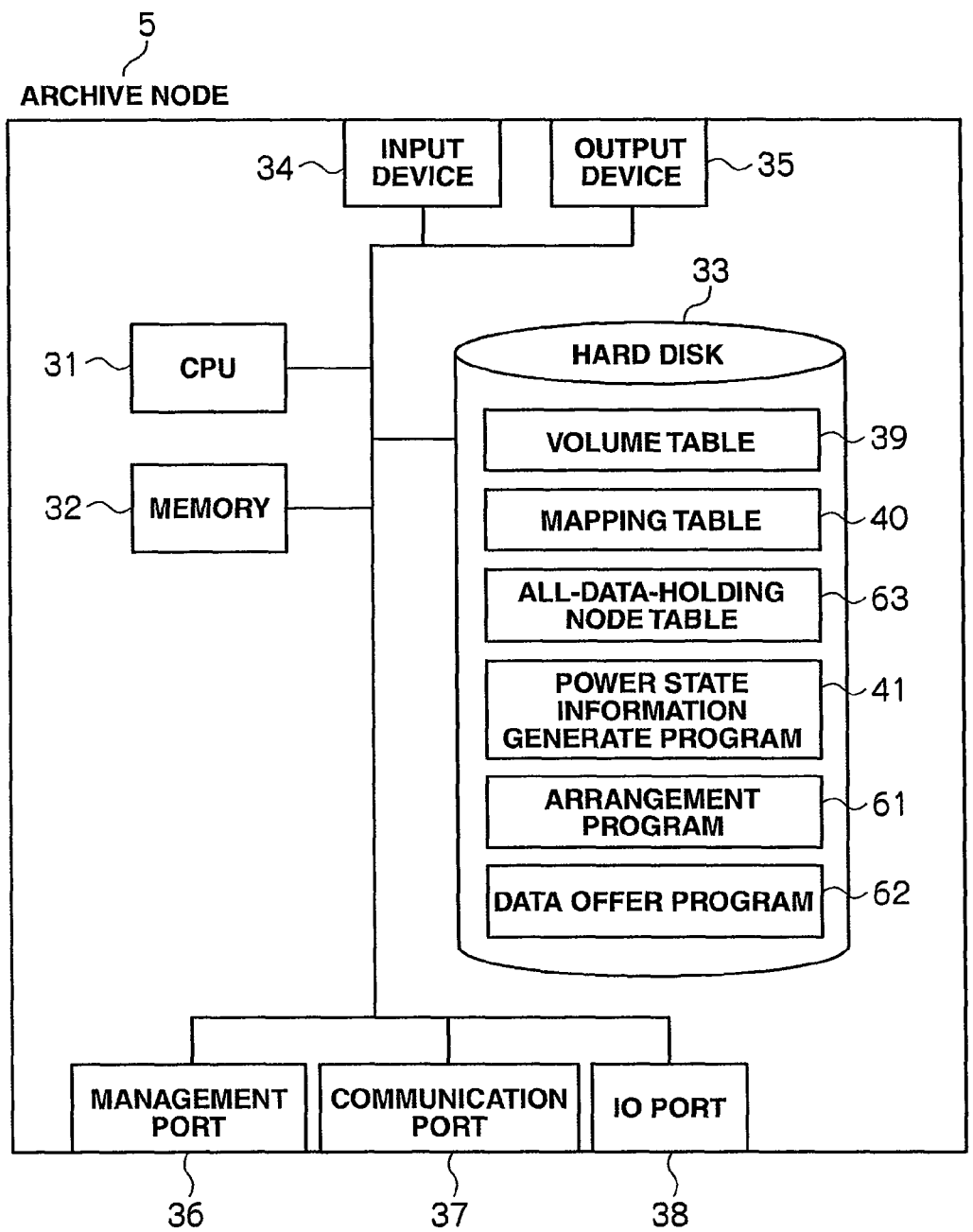
FIG. 14 is a diagram showing a configuration for an archive node (third embodiment).

FIG. 13 is a flowchart illustrating a procedure for the processing in accordance with the arrangement program 51 provided in the hard disk 33 in the archive node 5.

First, the arrangement program 51 receives archive data and redundancy which serve as a request to write archive data from the host computer 3 (SP21).

Then, the arrangement program 51 refers to the volume table 39, and checks the power state for the logical volume 26 used by the archive node 5 constituting the archive cluster 2 in accordance with the value in the column for the power state 39E (SP22).

After the checking of the power state (SP22), the arrangement program 51 checks whether or not the relationship where the number of the archive nodes 5 for which the value in the column for the power state 39E is "ON"<the received redundancy is satisfied (SP23).

Then, when the relationship where the number of the archive nodes 5 for which the value in the column for the power state 39E is "ON"<the received redundancy is satisfied (SP23: YES), the arrangement program 51 commands the archive node 5 for which the value in the column for the power state 39E is "ON" to write archive data (SP24).

Next, the arrangement program 51 selects the archive node(s) 5 for which the value in the column for the power state 39E is not "ON," i.e., for which the value in the column for the power state 39E is "OFF," which equal in number the number obtained by subtracting the number of archive nodes 5 for which the value in the column for the power state 39E is "ON" from the redundancy (SP25).

When there are plural candidate archive nodes 5 for the selection, the arrangement program 51 selects the archive node 5 with, e.g., the least used capacity 39D first.

In this embodiment, the archive node 5 with the least used capacity is selected first,. However, the archive node 5 that uses the logical volume 26 with the most unused capacity may be selected first. Alternatively, the archive node 5 that uses the logical volume 26 in the longest power-saving state may be selected first.

Next, the arrangement program 51 commands the storage apparatus 4 to turn on the power of the physical disk 25 constituting the logical volume 26 used by the selected archive node 5 (SP26).

Then, the arrangement program 51 commands the selected archive node 5 to write archive data (SP 27).

Meanwhile, when the relationship where the number of the archive nodes 5 for which the value in the column for the power state 39E is "ON"≧the received redundancy is satisfied, i.e., the relationship where the number of the archive nodes 5 for which the value in the column for the power state 39E is "ON"<the received redundancy is not satisfied (SP23: NO), the arrangement program 51 selects archive nodes 5 to equal in number the redundancy from among the archive nodes 5 for which the power state is "ON," and commands the selected archive nodes 5 to write archive data (SP28).

The above was a description of processing in accordance with the arrangement program 51 provided in the hard disk 33 in the archive node 5 in this embodiment.

Also, regarding the operation conducted when the archive node 5 receives a request to read archive data, methods disclosed in prior art, the method disclosed in the first embodiment, or other methods may be employed when reading archive data.

According to this embodiment, in the archive system 1, the access to the logical volume 26 composed of the physical disk 25 whose power is in an off or power saving mode can be reduced when reading archive data. Therefore, the period during which there is no access to the physical disk 25 can be lengthened. As a result, in the archive system 1, the period during which the power of the physical disk 25 is in an off or power saving mode can be lengthened, and accordingly, the advantageous effect of reduction of the power consumption of the storage apparatus 4 can be obtained.

(3) Configuration for Archive System in accordance with Third Embodiment

A third embodiment of the present invention will be described below with reference to the accompanying figures. The configuration for the archive system 1 in the third embodiment is substantially the same as those for the archive systems 1 in the first and second embodiments, but differs on the point that an arrangement program 61 and a data offer program 62 are provided in the hard disk 33 in the archive node 5. Also, the operation of the arrangement program 61 differs from that of the arrangement program 51 describe in the second embodiment, and the operation of the data offer program 62 differs from that of the data offer program 42 described in the first embodiment.

An all-data-holding node table 63 is also provided in the hard disk 33 in the archive node 5 in this embodiment.

Figure 15:
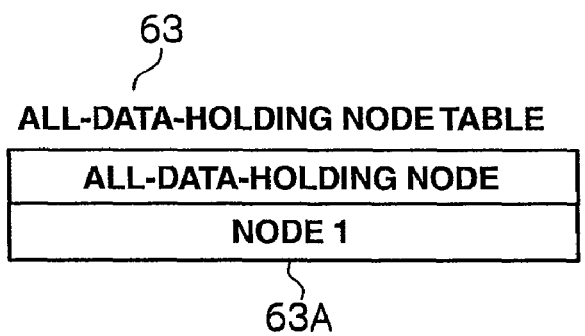
FIG. 15 is a diagram showing a configuration for an all-data-holding node table.

FIG. 15 is a diagram showing a configuration for the all-data-holding node table 63. The all-data-holding table 63 consists of a column for an all-data-holding node 63A for managing an archive node ID for the archive node 5 that holds all the archive data.

The operation of the arrangement program 61 and the operation of the data offer program 62, which are set in the hard disk 33 in the archive node 5, in this embodiment will be described below.

Figure 16:
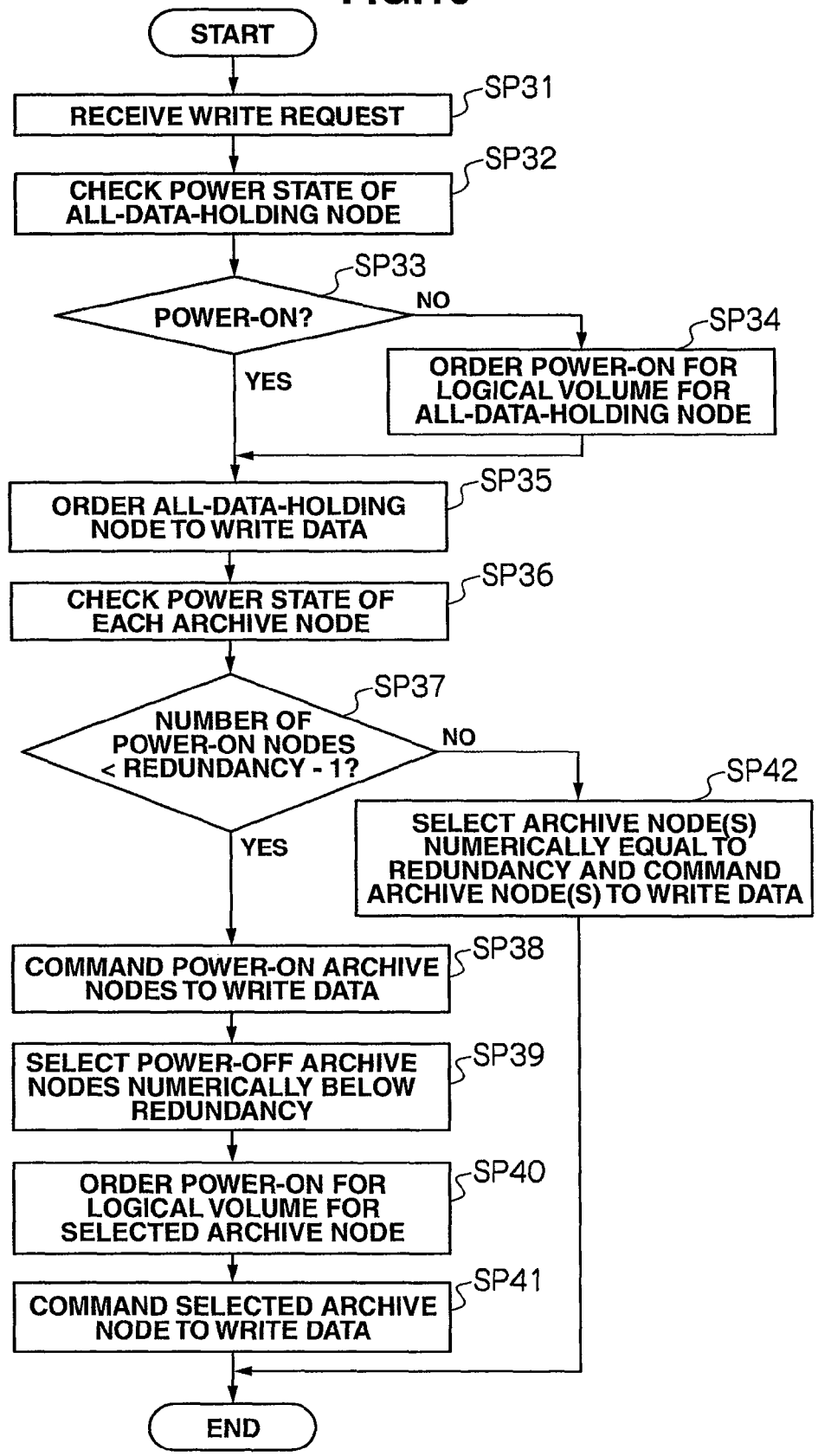
FIG. 16 is a flowchart illustrating a procedure for the processing in accordance with an arrangement program in an archive node (third embodiment).

FIG. 16 is a flowchart illustrating a procedure for the processing in accordance with the arrangement program 61 set in the hard disk 33 in the archive node 5.

First, the arrangement program 61 receives archive data and redundancy which serve as a request to write archive data from the host computer 3 (SP31).

Then, the arrangement program 61 refers to the volume table 39, and checks the value for the power state 39E for the record including the archive node ID 39A equivalent to the archive node ID stored in the column for the all-data-holding node 63A in the all-data-holding node table 63 (SP32).

After the checking of the power state (SP32), the arrangement program 61 checks whether the checked value of the power state 39E is "ON" (SP33).

When the checked value of the power state 39E is a value other than "ON," i.e., the confirmed value of the power state 39E is not "ON" (SP33: NO), the arrangement program 61 specifies the logical volume ID stored in the column for the logical volume ID 39C included in the retrieved record to the storage apparatus 4 with the storage ID in the retrieved record, and commands the storage apparatus 4 to turn on the power of the relevant physical disk 25 (SP34).

Meanwhile, when the checked value of the power state 39E is "ON" (SP33: YES), the arrangement program 61 does not execute any processing in particular.

Then, the arrangement program 61 commands the archive node 5 with the archive node ID stored in the column for the all-data-holding node 63A in the all-data-holding node table 63 to write archive data (SP35).

Next, the arrangement program 61 refers to the volume table 39, and checks the power state of each of the logical volumes 26 used by the archive nodes 5 other than the archive node 5 with its archive node ID stored in the column for the all-data-holding node 63A in the all-data-holding node table 63, from among the archive nodes 5 that constitute the archive cluster 2, in accordance with the value stored in the column for the power state 39E (SP36).

After the checking of the power state (SP36), the arrangement program 61 checks whether the relationship where the number of the archive nodes for which the value in the column for the power state 39E is "ON"<the received redundancy—1 is satisfied (SP37).

When the relationship where the number of the archive nodes for which the value in the column for the power state 39E is "ON"<the received redundancy—1 is satisfied (SP37: YES), the arrangement program 61 commands the archive node(s) for which the value in the column for the power state 39E is "ON" to write archive data (SP38).

Then, the arrangement program 61 selects the archive node(s) 5 for which the value in the column for the power state 39E is not "ON," i.e., for which the value in the column for the power state 39E is "OFF," which equal(s) in number the number obtained by subtracting the number obtained by adding one to the number of the archive nodes 5 for which the value in the column for the power state 39E is "ON" from the redundancy (SP39).

Note that, when there are plural candidate archive nodes 5 for the above selection, the arrangement program 61 selects the archive node 5, e.g., with the least value in the column for the used capacity 39D first.

In this embodiment, the archive node 5 with the least used capacity is selected first. However, the archive node 5 that uses the logical volume 26 with the most unused capacity may be selected first. Alternatively, the archive node 5 that uses the logical volume 26 in the longest power-saving state may be selected first.

Subsequently, the arrangement program 61 commands the storage apparatus 4 to turn on the power of the physical disk 25 constituting the logical volume 26 used by the selected archive node 5 (SP40).

Then, the arrangement program 61 commands the selected archive node 5 to write archive data (SP41).

Meanwhile, when the relationship where the number of the archive nodes for which the value in the column for the power state 39E is "ON"≧the received redundancy−1 is satisfied, i.e., the relationship where the number of the archive nodes<the received redundancy−1 is not satisfied (SP37: NO), the arrangement program 61 selects the archive node(s)

5 which equal(s) in number the number obtained by subtracting one from the redundancy from among the archive nodes 5 for which the power state is "ON," and commands the selected archive node(s) 5 to write archive data (SP42).

The above was a description of processing in accordance with the arrangement program 61 provided in the hard disk 33 in the archive node 5 in this embodiment.

Figure 17:
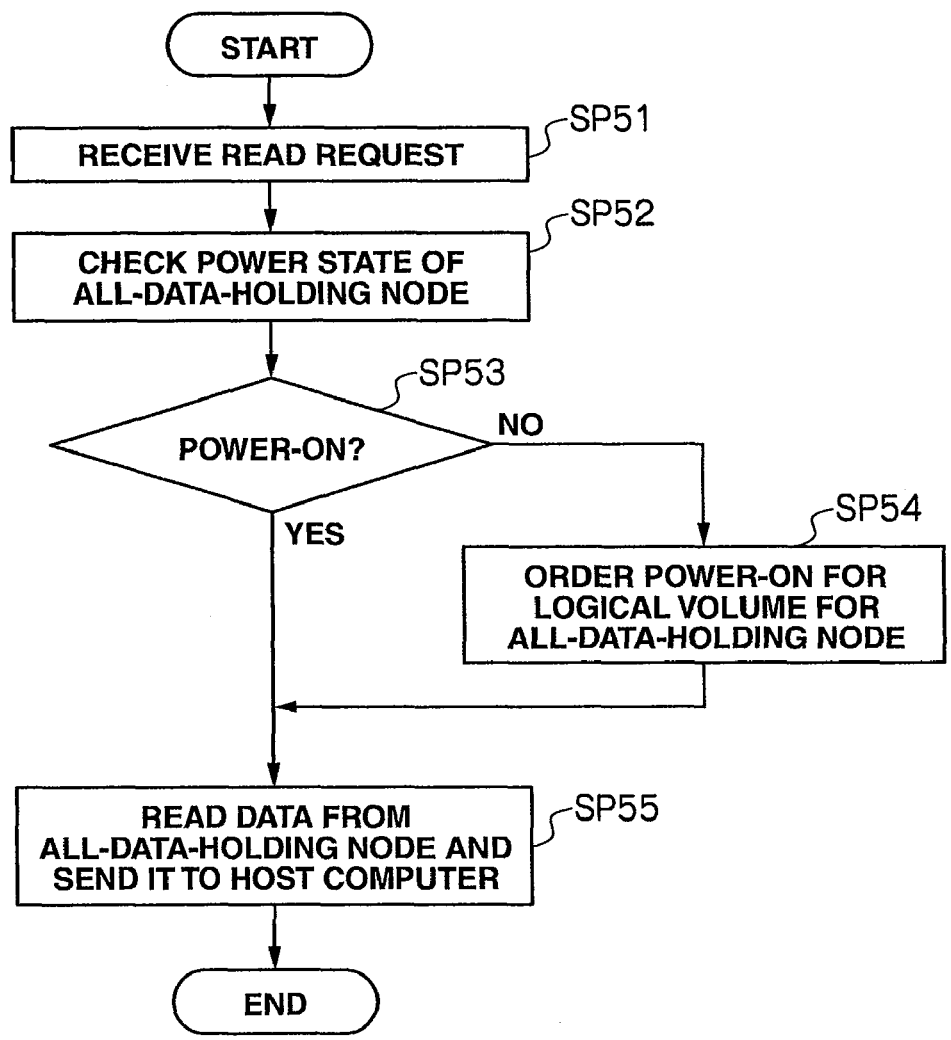
FIG. 17 is a flowchart illustrating a procedure for the processing in accordance with a data offer program in an archive node (third embodiment).

FIG. 17 is a flowchart illustrating a procedure for the processing in accordance with the data offer program 62 provided in the hard disk 33 in the archive node 5.

First, the data offer program 62 receives an archive data ID which serve as a request t for reading archive data from the host computer 3 (SP51).

Next, the data offer program 62 refers to the volume table 39, and checks the value for the power state 39E for the record including the archive node ID 39A equivalent to the archive node ID stored in the column for the all-data-holding node 63A in the all-data-holding node table 63 (SP52).

After the checking of the power state (SP52), the data offer program 62 checks whether or not the checked value of the power state 39E is "ON" (SP53).

When the checked value of the power state 39E has a value other than "ON," i.e., the checked value of the power state 39E is not "ON" (SP53: NO), the data offer program 62 specifies the logical volume ID stored in the column for the logical volume ID 39C included in the retrieved record to the storage apparatus 4 stored in the column for the storage ID 39B included in the record, and commands the storage apparatus 4 to turn on the power of the relevant physical disk 25 (SP54).

Meanwhile, when the checked value of the power state 39E is "ON" (SP53: YES), the data offer program 62 does not execute any processing in particular.

Then, the data offer program 62 commands the archive node 5 with the archive node ID stored in the column for the all-data-holding node 63A in the all-data-holding node table 63 to read archive data, and sends the obtained data to the host computer 3 that has issued the read request (SP55).

The above was a description of processing in accordance with the data offer program 62 provided in the hard disk 33 in the archive node 5 in this embodiment.

According to this embodiment, in the archive system 1, archive data can be read without turning on the power of each of the physical disks 25 other than the physical disks 25 that constitute a specific logical volume 26 when reading the archive data. Accordingly, the advantageous effect of reduction of the power consumption of the storage apparatus 4 can be obtained.

The invention can be widely used in not only archive systems that store the data sent from a host computer but also other various kinds of storage systems for storing data.

The invention claimed is:

1. A storage system comprising:
    plural information processing apparatuses, each of which copies data sent from a host computer to create archive data in accordance with redundancy sent from the host computer; and
    a storage apparatus including physical disks that store the archive data, and logical volumes configured of the physical disks,
    wherein the storage apparatus includes:
        a physical disk power state table that manages power state information that is information indicating whether or not a power state of each of the physical disks is "on"; and
        a logical volume table that manages the power state of each of the physical disks configuring each of the logical volumes at each of the information processing apparatuses, and
    wherein each of the information processing apparatuses includes:
        a volume management table that manages the power state of each of the physical disks configuring each of the logical volumes at each of the information processing apparatuses;
        an acquisition unit that acquires the power state information managed by the physical disk power state table; and
        a determination unit that determines an information processing apparatus targeted for reading or writing the archive data from among the information processing apparatuses based on the power state information acquired by the acquisition unit,
    wherein the determination is made by selecting an information processing apparatus at which the power state of the physical disk is "on" from among the information processing apparatuses in the volume management table.

2. The storage system according to claim 1, wherein the determination unit judges whether or not there is an information processing apparatus that uses the physical disk that is in a power-on state, and when there is such an information processing apparatus, the determination unit selects that information processing apparatus.

3. The storage system according to claim 1, wherein the determination unit judges whether or not there is an information processing apparatus that uses the physical disk that is in a power-on state, and when there is no such information processing apparatus, the determination unit puts the power state of the information processing apparatus targeted for reading or writing the archive data into "on."

4. The storage system according to claim 2, wherein when there are plural information processing apparatuses targeted for reading or writing the archive data, the determination unit selects a predetermined information processing apparatus from among the information processing apparatuses.

5. The storage system according to claim 4,
    wherein the physical disk power state table manages a power state change time that is a time when the power state of the physical disk is changed to "off",
    wherein the acquisition unit acquires the power state change time managed by the physical disk power state table, and
    wherein the determination unit selects the information processing apparatus with the earliest power state change time.

6. The storage system according to claim 4, wherein the determination unit selects the information processing apparatus that uses the physical disk having the least used capacity.

7. The storage system according to claim 4, wherein the determination unit selects the information processing apparatus that uses the physical disk having the most unused capacity.

8. The storage system according to claim 1, wherein the determination unit selects a specific information processing apparatus as the information processing apparatus targeted for reading or writing the archive data from the information processing apparatuses.

9. A power consumption reduction method for a storage system, the storage system comprising: plural information processing apparatuses, each of which copies data sent from a host computer to create archive data in accordance with redundancy sent from the host computer; and a storage apparatus including physical disks that store the archive data, and logical volumes configured of the physical disks, the method comprising:

acquiring power state information that is information indicating whether or not a power state of each of the physical disks is "on";

managing, by a logical volume table, the power state of each of the physical disks configuring each of the logical volumes at each of the information processing apparatuses;

managing, by a volume management table, the power state of each of the physical disks configuring each of the logical volumes at each of the information processing apparatuses; and determining an information processing apparatus targeted for reading or writing the archive data from among the information processing apparatuses based on the power state information acquired by the step of acquiring the power state information, wherein the determination is made by selecting an information processing apparatus at which the power state of the physical disk is "on" from among the information processing apparatuses in the volume management table.

10. The power consumption reduction method according to claim 9, wherein in the step of determining the information processing apparatus, it is judged whether or not there is an information processing apparatus that uses the physical disk that is in a power-on state, and when there is such an information processing apparatus, that information processing apparatus is selected.

11. The power consumption reduction method according to claim 9, wherein in the step of determining the information processing apparatus, it is judged whether or not there is an information processing apparatus that uses the physical disk that is in a power-on state, and when there is no such information processing apparatus, that determination unit puts the power state of the information processing apparatus targeted for reading or writing the archive data into "on."

12. The power consumption reduction method according to claim 10, wherein when there are plural information processing apparatuses targeted for reading or writing the archive data, a predetermined information processing apparatus is selected from among the information processing apparatuses.

13. The power consumption reduction method according to claim 12, wherein in the step of acquiring the power state information, the power state change time, which is a time when the power state of the physical disk is changed to "off," is acquired, and wherein in the step of determining the information processing apparatus, the information processing apparatus with the earliest power state change time is selected.

14. The power consumption reduction method according to claim 12, wherein in the step of determining the information processing apparatus, the information processing apparatus that uses the physical disk having the least used capacity is selected.

15. The power consumption reduction method according to claim 12, wherein in the step of determining the information processing apparatus, the information processing apparatus that uses the physical disk having the most unused capacity is selected.

16. The power consumption reduction method according to claim 9, wherein in the step of determining the information processing apparatus, a specific information processing apparatus is selected as the information processing apparatus targeted for reading or writing the archive data from the information processing apparatuses.

17. An information processing apparatus that copies data sent from a host computer to create archive data in accordance with redundancy sent from the host computer, the information processing apparatus comprising:

a volume management table that manages the power state of each of the physical disks configuring each of the logical volumes at each of the information processing apparatuses;

an acquisition unit that acquires power state information that is information indicating whether or not a power state of each of physical disks in a storage apparatus that stores the archive data is "on"; and a determination unit that determines an information processing apparatus targeted for reading or writing the archive data from among information processing apparatuses based on the power state information acquired by the acquisition unit, wherein the determination is made by selecting an information processing apparatus at which the power state of the physical disk is "on" from among the information processing apparatuses in the volume management table.

\* \* \* \* \*